US012118879B2

(12) United States Patent
Kwok et al.

(10) Patent No.: US 12,118,879 B2
(45) Date of Patent: Oct. 15, 2024

(54) C-V2X MOBILE EDGE COMPUTING INTERFACE FOR MOBILE SERVICES

(71) Applicant: T-Mobile USA, Inc., Bellevue, WA (US)

(72) Inventors: Ming Shan Kwok, Seattle, WA (US); Wafik Abdel Shahid, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 184 days.

(21) Appl. No.: 17/965,179

(22) Filed: Oct. 13, 2022

(65) Prior Publication Data

US 2024/0119840 A1    Apr. 11, 2024

Related U.S. Application Data

(60) Provisional application No. 63/414,305, filed on Oct. 7, 2022.

(51) Int. Cl.
  *G08G 1/01* (2006.01)
  *G06N 20/00* (2019.01)
  *G08G 1/16* (2006.01)

(52) U.S. Cl.
  CPC ........... *G08G 1/0112* (2013.01); *G06N 20/00* (2019.01); *G08G 1/164* (2013.01)

(58) Field of Classification Search
  CPC ........ G06N 20/00; G06N 3/08; G08G 1/0112; G08G 1/164; G08G 1/166
  See application file for complete search history.

(56) References Cited

U.S. PATENT DOCUMENTS

| 5,223,844 | A  | 6/1993  | Mansell et al. |
| 6,161,071 | A  | 12/2000 | Shuman et al. |
| 6,611,740 | B2 | 8/2003  | Lowrey et al. |
| 6,708,107 | B2 | 3/2004  | Impson et al. |
| 6,983,139 | B2 | 1/2006  | Dowling et al. |
| 7,027,808 | B2 | 4/2006  | Wesby |
| 7,155,321 | B2 | 12/2006 | Bromley et al. |
| 7,484,008 | B1 | 1/2009  | Gelvin et al. |

(Continued)

FOREIGN PATENT DOCUMENTS

| CN | 102647454 A | 8/2012 |
| CN | 103701838 A | 4/2014 |

(Continued)

*Primary Examiner* — Omer S Khan
(74) *Attorney, Agent, or Firm* — Perkins Coie LLP

(57) ABSTRACT

A computer server receives messages from a computer device located in proximity to the computer server. The messages are generated by at least one vehicle and translated into IP packets using an N2 control plane interface and an N3 user plane interface implemented in the computer device. A message can include a direction of operation of a vehicle. From a mobile device, information is received describing motion of a user of the mobile device. The information includes a trajectory of the user. The mobile device and the vehicle are located at less than a threshold distance from the computer device. A potential collision is determined between the vehicle and the user based on the direction of operation of the vehicle and the trajectory of the user. An alert is sent to the mobile device indicating the potential collision.

15 Claims, 7 Drawing Sheets

(56) References Cited

U.S. PATENT DOCUMENTS

| | | |
|---|---|---|
| 7,653,186 B2 | 1/2010 | Hosain et al. |
| 7,693,720 B2 | 4/2010 | Kennewick et al. |
| 7,747,365 B1 | 6/2010 | Lowrey et al. |
| 7,941,158 B2 | 5/2011 | Olson |
| 7,966,111 B2 | 6/2011 | Moinzadeh et al. |
| 8,073,590 B1 | 12/2011 | Zilka |
| 8,126,435 B2 | 2/2012 | George |
| 8,140,358 B2 | 3/2012 | Ling et al. |
| 8,265,862 B1 | 9/2012 | Zilka |
| 8,472,942 B2 | 6/2013 | Ying |
| 8,666,382 B2 | 3/2014 | Silver |
| 8,768,565 B2 | 7/2014 | Jefferies et al. |
| 9,092,984 B2 | 7/2015 | Bahl et al. |
| 9,153,131 B2 | 10/2015 | Santucci et al. |
| 9,188,449 B2 | 11/2015 | Biswal et al. |
| 9,224,293 B2 | 12/2015 | Taylor |
| 9,260,244 B1 | 2/2016 | Cohn |
| 9,367,968 B2 | 6/2016 | Giraud et al. |
| 9,483,886 B2 | 11/2016 | Bergerhoff et al. |
| 9,591,482 B1 | 3/2017 | Finnerty et al. |
| 9,615,213 B2 | 4/2017 | Tibbitts et al. |
| 9,626,198 B2 | 4/2017 | Hess |
| 9,632,502 B1 | 4/2017 | Levinson et al. |
| 9,633,318 B2 | 4/2017 | Plante |
| 9,635,534 B2 | 4/2017 | Maier et al. |
| 9,648,107 B1 | 5/2017 | Penilla et al. |
| 9,688,286 B2 | 6/2017 | Wilkes et al. |
| 9,743,260 B2 | 8/2017 | Wilson et al. |
| 9,773,251 B2 | 9/2017 | Liu et al. |
| 9,776,847 B2 | 10/2017 | Mondal et al. |
| 9,809,159 B1 | 11/2017 | Snyder et al. |
| 9,820,120 B2 | 11/2017 | Decharms |
| 9,832,241 B1 | 11/2017 | Hayward |
| 9,869,560 B2 | 1/2018 | Gordon et al. |
| 9,886,856 B2 | 2/2018 | Dougherty |
| 9,888,080 B2 | 2/2018 | Miao |
| 9,928,734 B2 | 3/2018 | Newman |
| 9,928,738 B2 | 3/2018 | Bauer et al. |
| 9,944,282 B1 | 4/2018 | Fields et al. |
| 9,949,098 B2 | 4/2018 | Archer et al. |
| 9,953,283 B2 | 4/2018 | Sweeney et al. |
| 9,963,106 B1 | 5/2018 | Ricci |
| 10,026,506 B1 | 7/2018 | Laborde |
| 10,037,689 B2 | 7/2018 | Taylor |
| 10,044,769 B2 | 8/2018 | Mufti et al. |
| 10,049,571 B2 | 8/2018 | Parundekar et al. |
| 10,086,756 B2 | 10/2018 | Manci et al. |
| 10,150,471 B2 | 12/2018 | Funk et al. |
| 10,218,771 B2 | 2/2019 | Penilla et al. |
| 10,222,773 B2 | 3/2019 | Funk et al. |
| 10,235,882 B1 | 3/2019 | Aoude et al. |
| 10,299,100 B2 | 5/2019 | Beyer et al. |
| 10,303,817 B2 | 5/2019 | Sebastian et al. |
| 10,354,230 B1 | 7/2019 | Hanson et al. |
| 10,496,469 B2 | 12/2019 | Fox |
| 10,520,947 B2 | 12/2019 | Liu et al. |
| 10,616,734 B1 | 4/2020 | Lekutai |
| 10,812,992 B1 | 10/2020 | Tran et al. |
| 10,890,907 B2 | 1/2021 | Lu |
| 10,894,484 B2 | 1/2021 | Han et al. |
| 10,909,866 B2 | 2/2021 | Jacobus et al. |
| 10,916,140 B2 | 2/2021 | Lu et al. |
| 10,971,006 B2 | 4/2021 | Szilagyi et al. |
| 11,064,057 B2 | 7/2021 | Sabella et al. |
| 11,076,318 B2 | 7/2021 | Shan et al. |
| 11,113,969 B2 | 9/2021 | Avedisov et al. |
| 11,132,897 B2 | 9/2021 | Mcerlean et al. |
| 11,176,389 B2 | 11/2021 | Bazargan et al. |
| 11,176,828 B2 | 11/2021 | Wright et al. |
| 11,231,905 B2 | 1/2022 | Cordourier Maruri et al. |
| 11,234,204 B2 | 1/2022 | Ding et al. |
| 11,282,013 B2 | 3/2022 | Rana et al. |
| 11,445,362 B2 | 9/2022 | Liu et al. |
| 2002/0026491 A1 | 2/2002 | Mason et al. |
| 2003/0162536 A1 | 8/2003 | Panico |
| 2004/0039504 A1 | 2/2004 | Coffee et al. |
| 2005/0251304 A1 | 11/2005 | Cancellara et al. |
| 2006/0291455 A1 | 12/2006 | Katz et al. |
| 2008/0157943 A1 | 7/2008 | Rennie et al. |
| 2010/0305807 A1 | 12/2010 | Basir et al. |
| 2011/0270487 A1 | 11/2011 | Dickinson et al. |
| 2012/0105625 A1* | 5/2012 | Richardson .......... G01B 11/022 348/135 |
| 2013/0103236 A1 | 4/2013 | Mehrgan |
| 2014/0066014 A1 | 3/2014 | Nicholson et al. |
| 2014/0195102 A1 | 7/2014 | Nathanson |
| 2016/0231746 A1 | 8/2016 | Hazelton et al. |
| 2017/0032402 A1 | 2/2017 | Patsiokas et al. |
| 2017/0352103 A1 | 12/2017 | Choi et al. |
| 2018/0276912 A1 | 9/2018 | Zhou |
| 2018/0322413 A1 | 11/2018 | Yocam et al. |
| 2019/0135303 A1 | 5/2019 | Kim et al. |
| 2019/0265059 A1 | 8/2019 | Warnick et al. |
| 2019/0354838 A1 | 11/2019 | Zhang et al. |
| 2020/0020227 A1 | 1/2020 | Ran et al. |
| 2020/0020228 A1 | 1/2020 | Cheng et al. |
| 2020/0062274 A1 | 2/2020 | Kowal et al. |
| 2020/0064444 A1 | 2/2020 | Regani et al. |
| 2020/0164763 A1 | 5/2020 | Holme |
| 2020/0174778 A1 | 6/2020 | David et al. |
| 2020/0294401 A1 | 9/2020 | Kerecsen |
| 2020/0314614 A1 | 10/2020 | Moustafa et al. |
| 2020/0334979 A1 | 10/2020 | Gonçalves et al. |
| 2020/0342750 A1 | 10/2020 | Sakr |
| 2020/0364800 A1 | 11/2020 | Fujii et al. |
| 2020/0389469 A1 | 12/2020 | Litichever et al. |
| 2021/0004729 A1 | 1/2021 | Sui et al. |
| 2021/0097311 A1 | 4/2021 | Mcbeth et al. |
| 2021/0099848 A1 | 4/2021 | Ruan et al. |
| 2021/0112425 A1* | 4/2021 | Tran ..................... H04W 16/28 |
| 2021/0116907 A1 | 4/2021 | Altman |
| 2021/0221390 A1 | 7/2021 | Slobodyanyuk et al. |
| 2021/0300418 A1 | 9/2021 | Alvarez et al. |
| 2021/0312796 A1* | 10/2021 | Lull ..................... B60W 30/08 |
| 2021/0319332 A1 | 10/2021 | Isaac |
| 2022/0006882 A1* | 1/2022 | Sabella .................. H04L 67/12 |
| 2022/0046391 A1* | 2/2022 | Ong ........................ H04W 4/08 |
| 2022/0076282 A1 | 3/2022 | Monassebian et al. |
| 2022/0161818 A1 | 5/2022 | Solmaz et al. |
| 2022/0167262 A1 | 5/2022 | Ding et al. |
| 2022/0169258 A1 | 6/2022 | Samarthyam et al. |
| 2022/0172609 A1 | 6/2022 | Jha et al. |
| 2022/0217170 A1 | 7/2022 | Qi et al. |
| 2022/0227360 A1 | 7/2022 | Delhaye et al. |
| 2022/0272084 A1 | 8/2022 | Hyatt |
| 2022/0292543 A1 | 9/2022 | Henderson |
| 2024/0046791 A1* | 2/2024 | Das ........................ G08G 1/012 |

FOREIGN PATENT DOCUMENTS

| | | |
|---|---|---|
| CN | 103942616 B | 5/2015 |
| CN | 103413452 B | 12/2015 |
| CN | 103200460 B | 3/2016 |
| CN | 103413411 B | 6/2016 |
| CN | 106926945 A | 7/2017 |
| CN | 104590208 B | 12/2017 |
| CN | 109255005 A | 1/2019 |
| CN | 105743968 B | 4/2019 |
| CN | 105376293 B | 4/2020 |
| CN | 111260946 A | 6/2020 |
| CN | 108881439 B | 10/2020 |
| CN | 109118758 B | 10/2020 |
| CN | 111930400 A | 11/2020 |
| CN | 112289059 A | 1/2021 |
| CN | 110930747 B | 11/2021 |
| CN | 111210618 B | 6/2022 |
| CN | 112788086 B | 8/2022 |
| EP | 1806714 A1 | 7/2007 |
| EP | 2130184 A2 | 12/2009 |
| EP | 2891341 A1 | 7/2015 |
| EP | 2949144 A2 | 12/2015 |
| EP | 3440870 A1 | 2/2019 |
| JP | 2018074579 A | 5/2018 |
| JP | 6705073 B2 | 5/2020 |

(56) References Cited

FOREIGN PATENT DOCUMENTS

| | | | |
|---|---|---|---|
| KR | 20190072077 | A | 6/2019 |
| KR | 20220089342 | A | 6/2022 |
| KR | 20220089349 | A | 6/2022 |
| WO | 0078057 | A1 | 12/2000 |
| WO | 0079727 | A2 | 12/2000 |
| WO | 0154044 | A1 | 7/2001 |
| WO | 2010119182 | A1 | 10/2010 |
| WO | 2016210432 | A1 | 12/2016 |
| WO | 2017091877 | A1 | 6/2017 |
| WO | 2018031070 | A1 | 2/2018 |
| WO | 2018140505 | A1 | 8/2018 |
| WO | 2018215833 | A1 | 11/2018 |
| WO | 2019156955 | A1 | 8/2019 |
| WO | 2020128455 | A2 | 6/2020 |
| WO | 2020151468 | A1 | 7/2020 |
| WO | 2020226979 | A2 | 11/2020 |
| WO | 2020231952 | A1 | 11/2020 |
| WO | 2021144772 | A1 | 7/2021 |

\* cited by examiner

C-V2X MOBILE EDGE COMPUTING INTERFACE FOR MOBILE SERVICES

CROSS-REFERENCE TO RELATED APPLICATION

This application claims the benefit of U.S. Provisional Patent Application No. 63/414,305, filed on Oct. 7, 2022, entitled "GENERATION OF C-V2X EVENT MESSAGES AND MOBILE EDGE COMPUTING INTERFACE," and incorporated herein by reference in its entirety.

BACKGROUND

A self-driving car, also known as an autonomous vehicle, driver-less car, or robotic car (robo-car), is a car incorporating vehicular automation, that is, a ground vehicle that is capable of sensing its environment and moving safely with little or no human input. Self-driving cars combine a variety of sensors to perceive their surroundings, such as thermographic cameras, radar, lidar, sonar, GPS, odometry and inertial measurement units. Advanced control systems interpret sensory information to identify appropriate navigation paths, as well as obstacles and relevant signage. Autonomous vehicles are predicted to have a comprehensive impact on the automobile industry, health, welfare, urban planning, traffic, insurance, labor market and other fields.

Road and weather conditions pose challenges to autonomous vehicles. Road conditions can be unpredictable and vary from place to place. In some cases, road conditions are deteriorated, e.g., no lane markings. Weather can be sunny and clear, rainy, or stormy, posing challenges to vehicles' sensors. Bad weather, heavy traffic, or road signs with graffiti on them can negatively impact the accuracy of vehicles' sensing capabilities. Moreover, the implementation of an autonomous driving environment encompasses not only complex automotive technology, but also human behavior, ethics, traffic management strategies, policies, and liability.

BRIEF DESCRIPTION OF THE DRAWINGS

Detailed descriptions of implementations of the present technology will be described and explained through the use of the accompanying drawings.

Figure 1:
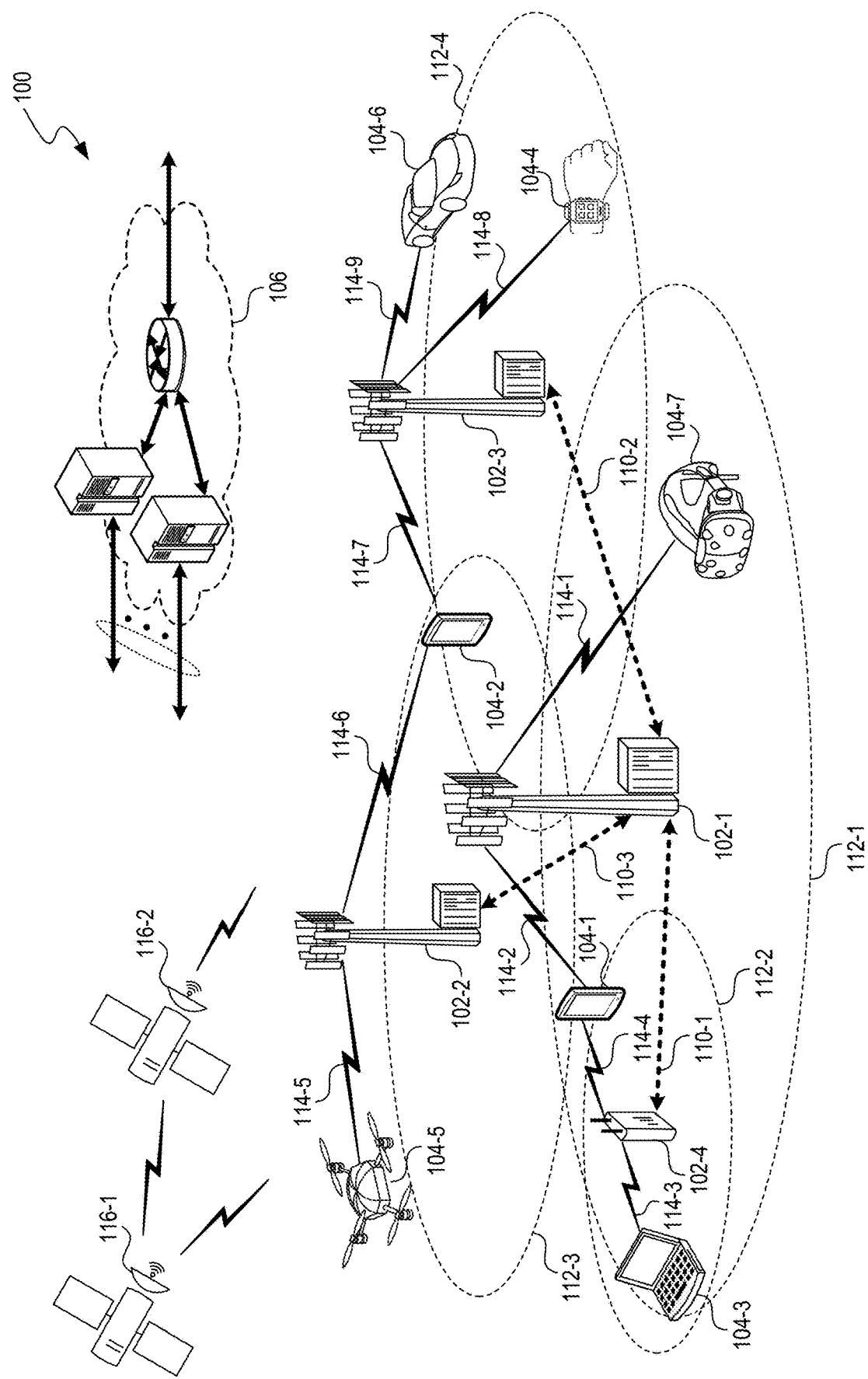
FIG. 1 is a block diagram that illustrates an example wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Autonomous driving, driver assistance, cooperative operations, remote driving, traffic management, and other applications of vehicle-to-vehicle (V2V) direct communications can benefit from cellular vehicle-to-everything (C-V2X) communications. C-V2X supports both direct communications (e.g., PC5) between vehicles and mobile communications between vehicles and mobile networks. By using C-V2X communications, the data and information exchanged between the vehicles on the V2V network can be exposed to improve road usage or improve autonomous vehicle driving models.

Autonomous vehicles gather vast amounts of data locally on the vehicle's onboard unit (OBU) in order to properly drive on the roadways. For example, autonomous vehicles can gather information about the hazards around them, their route, their current location, their speed and direction, and the actions they take when a hazard is encountered. By taking advantage of the C-V2X communication system, data can be sent outside of each vehicle in order to constantly teach and improve the autonomous driving model. Each autonomous vehicle sends C-V2X communications as event messages.

The event messages can contain all of the information that the autonomous vehicle is gathering including the time and details about the actions the vehicle is taking, such as its direction, speed, location, route, and what actions are needed in order to avoid some perceived hazard. The OBU of each vehicle sends this data anonymously over the PC5 interface to a roadside unit (RSU) or a computer device that interfaces with a cloud server or a local mobile edge computing (MEC) server. The RSU or computer device transmits the communications over the Uu interface to a local MEC server or a cloud server, which analyzes the data from every connected vehicle. The autonomous driving model is updated using the analyzed data from every vehicle. Once the model is updated, it is sent back over an interface for cellular communication (sometimes referred to as a "Uu interface") to the RSU or computer device. The RSU sends an updated model back over the PC5 interface to each vehicle's OBU in order to update its autonomous driving model. The autonomous driving model is updated in real time and not solely when a manufacturer initiates an update.

In some implementations, a computer server (e.g., a local MEC server) receives at least one message from a computer device (e.g., an RSU). The computer device is located in proximity to the computer server. The messages are generated by at least one vehicle and sent by the vehicles to the computer device over a PC5 interface. The messages are translated into IP packets using an N2 control plane interface and an N3 user plane interface implemented in the computer device. A message can include a direction of operation of a vehicle. From a mobile device, information is received describing the motion of a user of the mobile device. The information includes a trajectory of the user. The mobile device is located at less than a threshold distance from the computer device. The vehicle is operating at less than the threshold distance from the computer device. A potential collision is determined between the vehicle and the user based on the direction of operation of the vehicle and the trajectory of the user. An alert is sent to the mobile device indicating the potential collision.

In some implementations, a computer device (e.g., an RSU) receives messages from a first set of vehicles that are traveling near the computer device. The messages describe events triggered by the first set of vehicles in response to multiple C-V2X safety messages. Each of the messages is received by a vehicle from the computer device or another vehicle over a PC5 interface. A timestamp is assigned to each of the events. A feature vector is extracted from the timestamped events. An ML model generates an update to functionality of the computer device based on the feature vector. The ML model is trained to update the functionality for vehicular management by the computer device. The computer device operates using the updated functionality to communicate with a second set of vehicles over the PC5 interface. The computer device prevents collisions among the second set of vehicles using the updated functionality.

The benefits and advantages of the implementations described herein include enabling cloud computing capabilities and an information technology (IT) service environment for autonomous vehicles at the edge of the cellular network. By running applications and performing processing tasks closer to vehicles and cellular users, network congestion and latency is reduced. The MEC technology described herein enables flexible and rapid deployment of new applications and services for vehicles and customers. Moreover, MEC enables cellular operators to open their radio access network (RAN) to authorized third parties, such as application developers and content providers. In addition, the advantages of the convolutional neural network (CNN) used for ML in the disclosed embodiments include the obviation of feature extraction and the use of shared weight in convolutional layers, which means that the same filter (weights bank) is used for each node in the layer; this both reduces memory footprint and improves performance.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (VVWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, ora coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
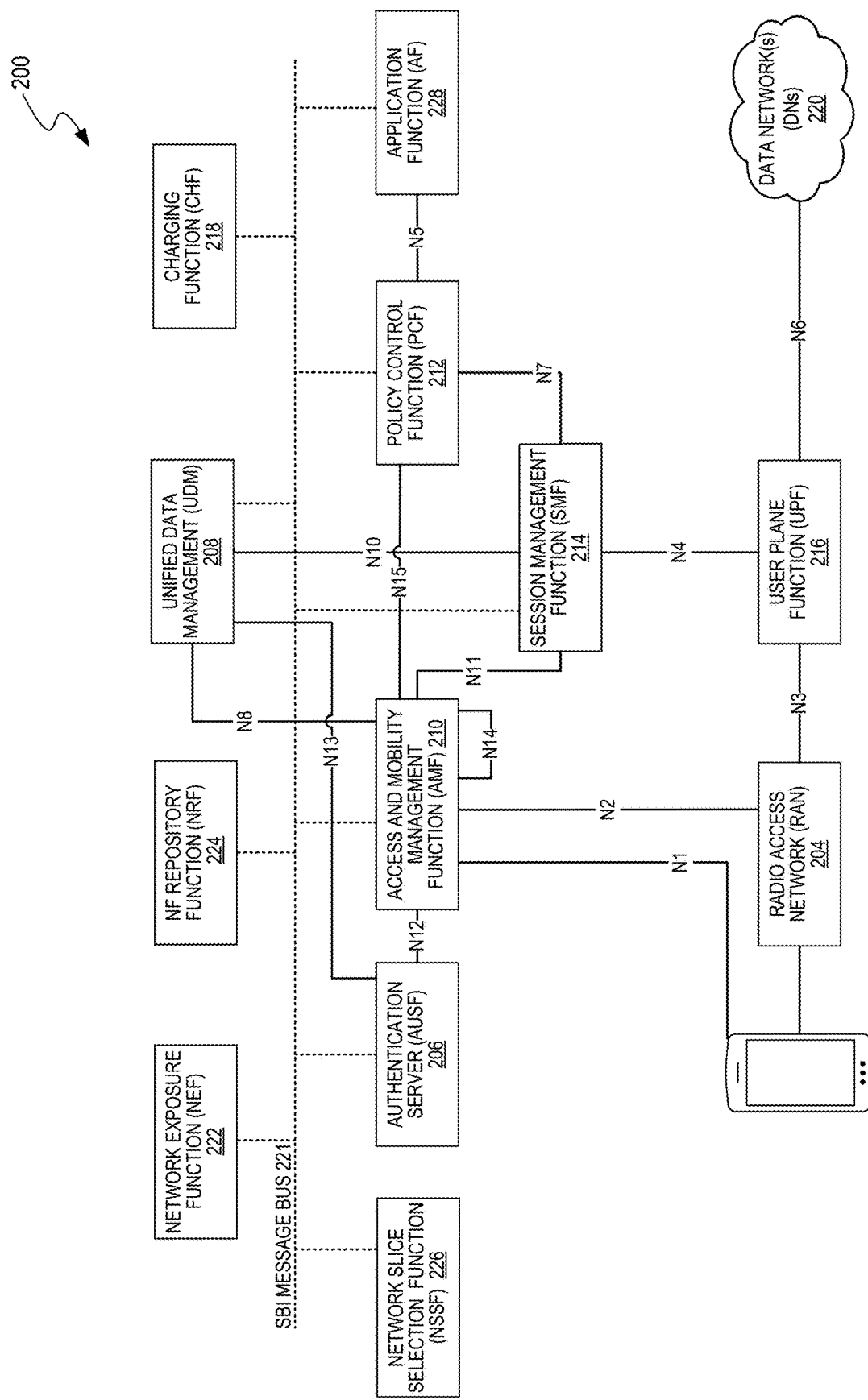
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given the large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

C-V2X Mobile Edge Computing Interface for Mobile Services

Figure 3:
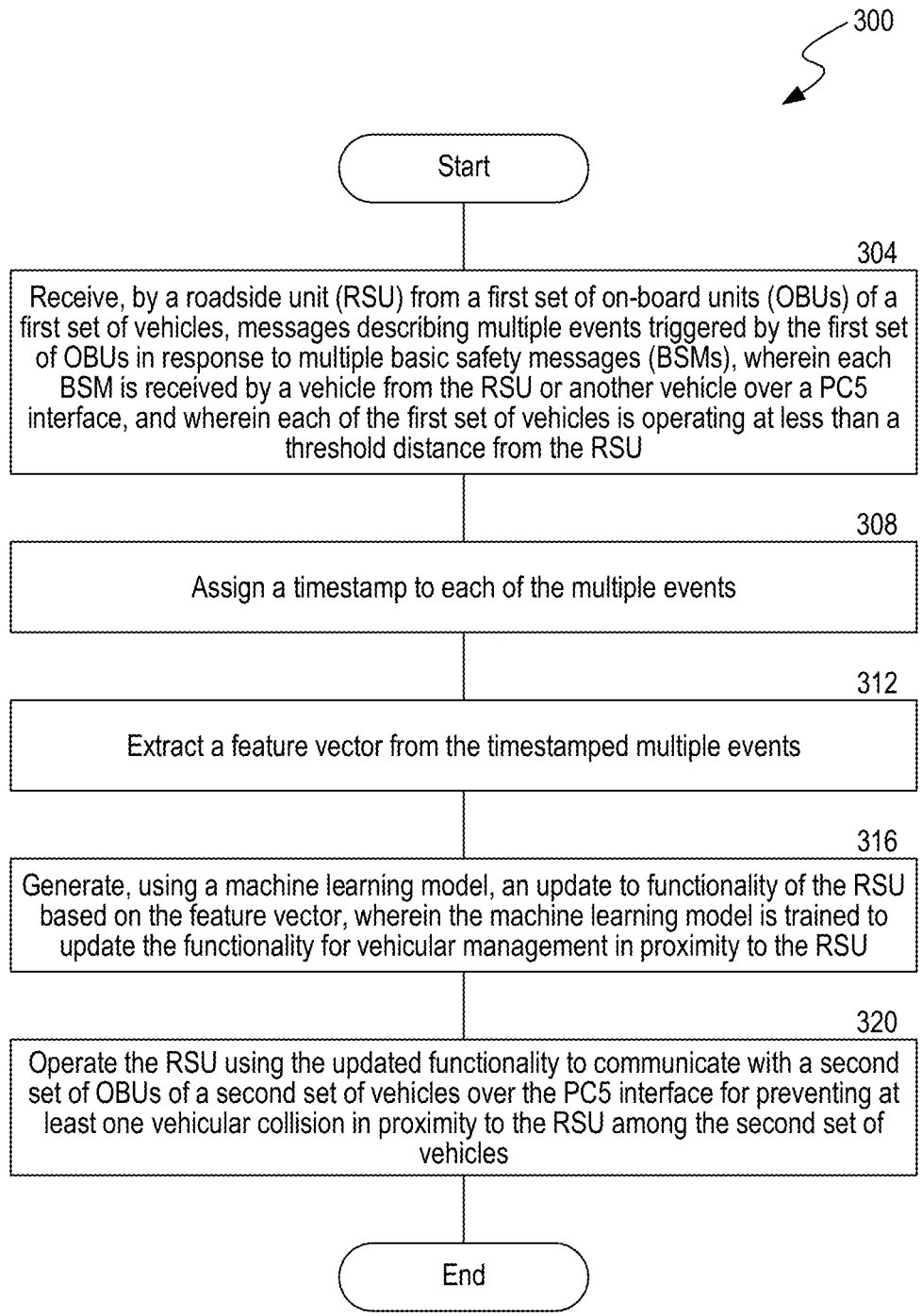
FIG. 3 is a flowchart that illustrates an example process for generation of C-V2X event messages for machine learning (ML).

FIG. 3 is a flowchart that illustrates an example process 300 for generation of C-V2X event messages for machine learning (ML). In some embodiments, the process 300 is performed by a roadside unit (RSU). An RSU is a communicating node or a computer device used in a vehicular communication system, such as C-V2X. The RSU provides other RSUs and vehicles with information, such as safety warnings and traffic information. In some embodiments, the process 300 is performed by a computer system, e.g., the example computer system 700 illustrated and described in more detail with reference to FIG. 7. Particular entities, for example, the interface device 516 or the local mobile edge computing (MEC) server 512, perform some or all of the steps of the process in other embodiments. A local MEC server is sometimes referred to as a "multi-access edge computing server." The interface device 516 and the local MEC server 512 are illustrated and described in more detail with reference to FIG. 5. Likewise, embodiments can include different and/or additional steps or can perform the steps in different orders.

Figure 5:
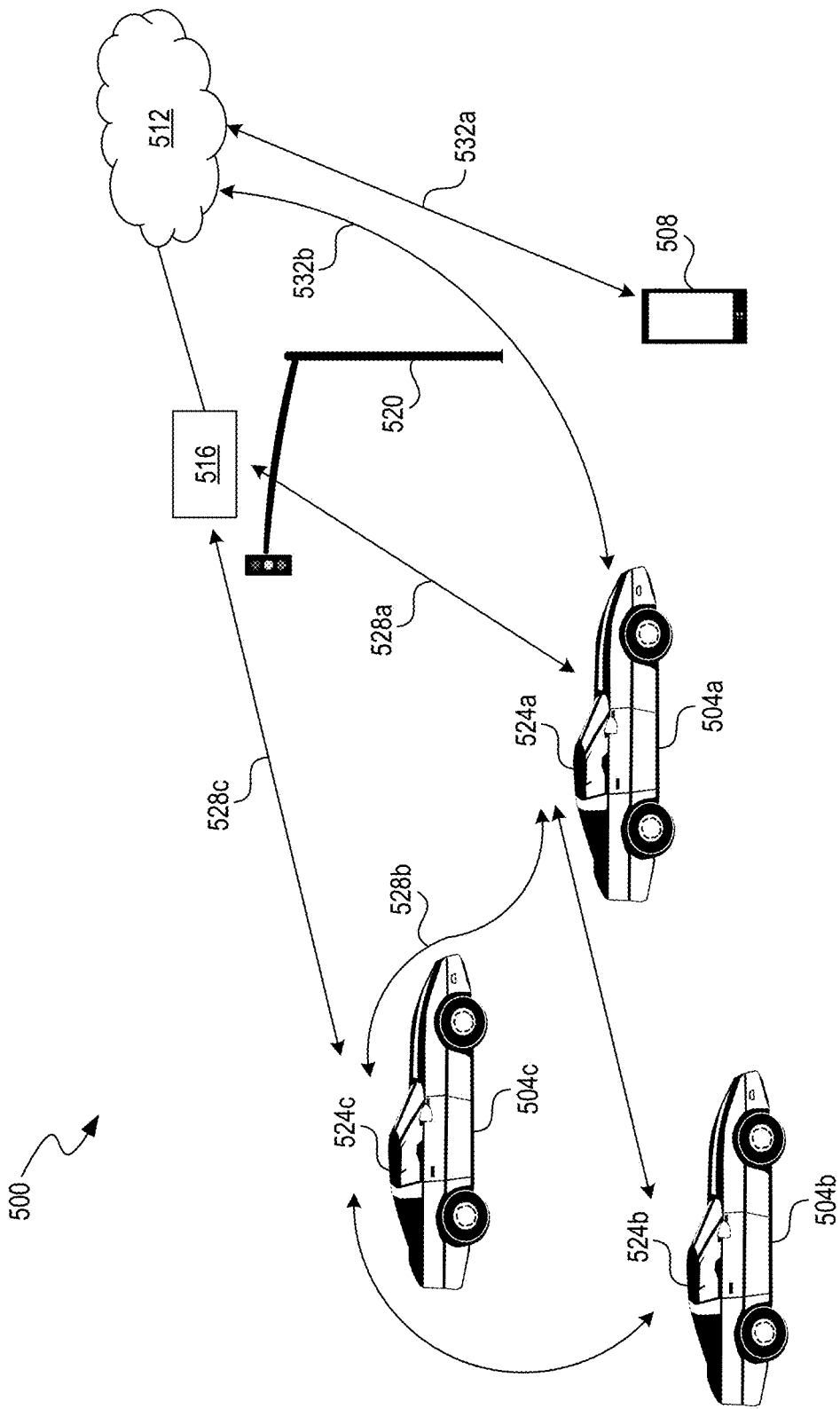
FIG. 5 is a block diagram that illustrates an example C-V2X local MEC server interface for mobile services.

At 304, a computer device (e.g., an RSU or a local MEC server) receives multiple messages from a first set of vehicles (e.g., from on-board units (OBUs) of the first set of vehicles). An interface device 516 that can be used as an RSU is illustrated and described in more detail with reference to FIG. 5. Example vehicles 504a-c and OBUs 524a-c are illustrated and described in more detail with reference to FIG. 5. The first set of vehicles can include vehicles 504a-b. An OBU is a transceiver that is normally mounted in or on a vehicle, or which in some instances is a portable unit. An OBU can be operational while a vehicle or person is either mobile or stationary. The messages describe multiple events triggered by the OBUs in response to multiple basic safety messages (BSMs). A BSM is a message that contains information about a vehicle's position, heading, speed, or other information relating to the vehicle's state and predicted path. Each of the multiple BSMs is received by a vehicle (e.g., vehicle 504a) of the first set of vehicles from the RSU or from another vehicle (e.g., vehicle 504b) of the first set of vehicles 504a-b over a PC5 interface. The PC5 interface 528a is between vehicle 504a (OBU 524a) and device 516 as illustrated in FIG. 5.

The messages describing the events can be encoded in different formats. The formats specify how the bits in the messages are used to encode information. In an example, the messages can use lossless data compression. In an example, the messages can act as a container for other types of data and metadata. In an example, the messages can contain any stream of characters, including possible control characters, and be encoded in one of various character encoding schemes. In some implementations, the messages describing the events are separated into headers, payloads, and footers.

Direct communication between vehicles and other devices uses the PC5 interface 528. PC5 refers to a reference state where a vehicle directly communicates with another vehicle or an RSU over a communication channel. Using the PC5 interface, communication with a base station is not required. Each of the first set of vehicles 504a-b is operating at less than a threshold distance from the RSU. The RSU performs local traffic management functions within an area that lies within the threshold distance from the RSU. For example, the threshold distance can be 0.01 miles, 0.05 miles, or 0.1 miles.

In some implementations, the messages describing the multiple events are generated by the first set of OBUs based on data obtained from an electronic control module (ECM) or at least one on-board sensor of at least one vehicle. An ECM is an embedded system in automotive electronics that controls one or more of the electrical systems or subsystems in a car or other motor vehicle. An ECM collects data from an engine control unit, a powertrain control unit, a transmission control unit, a brake control unit, a timing unit, a body control unit, or a suspension control unit. An on-board sensor can be a camera, a RADAR sensor, a LiDAR sensor, a speed sensor, an accelerometer, etc. The messages describing the multiple events can include a speed of a vehicle or another vehicle, a location of a vehicle (e.g., GPS coordinates), or a direction of operation (heading) of a vehicle.

At 308, in some implementations, the RSU assigns a timestamp to each of the multiple events. The timestamp is a sequence of characters or encoded information identifying when the event occurred, usually giving date and time of day. The timestamp can be accurate to a small fraction of a second. In some implementations, each of the multiple events is timestamped by the OBU generating the event. In some implementations, the RSU anonymizes the messages describing the multiple events with respect to an identity of each of the first set of vehicles. In an example, the identity of the driver (if detected), license plate information, and vehicle registration information is removed from the message. In some implementations, personally identifiable information (PII) that could potentially identify a specific individual is removed from the messages when the messages are generated by the OBUs.

At 312, the RSU extracts a feature vector from the timestamped multiple events. Feature extraction and an example feature vector 612 are illustrated and described in more detail with reference to FIG. 6. In some implementations, the feature vector includes at least one feature describing a left turn assist (LTA), an intersection movement assist (IMA), an emergency electronic brake light (EEBL), a forward collision warning (FCW), a blind spot warning (BSW), a lane change warning (LCW), a transit signal priority (TSP), or a reduced speed school zone (RSSZ). An LTA is an event when a BSM from the RSU or from another vehicle warns a vehicle or a driver of oncoming vehicles, including vehicles that are not visible because of obstructions. An LTA reduces the risk of collisions with oncoming traffic. A message describing an LTA event can include the resulting behavior by the vehicle, e.g., forgoing the left turn.

An IMA event occurs when a vehicle or a driver is warned that it is not safe to enter an intersection due to a risk of collision with another vehicle. An IMA provides collision warning information to a vehicle's operational system, which can perform actions to reduce the likelihood of a crash at the intersection. An EEBL warns a vehicle of a hard braking event in front, even when the vehicle's view is obstructed by other vehicles or bad weather conditions. An EEBL enables a vehicle to broadcast a self-generated emergency brake event to surrounding vehicles. An FCW event is triggered when a sensor scans the road ahead of a vehicle for obstacles such as other vehicles, fixed objects, and even pedestrians. The message describing an FCW event can include the speed and distance of a vehicle from other objects.

A BSW event is triggered by detecting another vehicle or object in hard-to-see areas, commonly known as "blind spots." A BSW event and an LCW event are triggered to warn a vehicle during a lane change attempt if the blind-spot zone into which the vehicle intends to switch is, or will be, occupied by another vehicle traveling in the same direction. A TSP event is triggered when technology is used to reduce dwell time at traffic signals for transit vehicles by holding green lights longer or shortening red lights. The message describing a TSP event can describe the difference in speeds of vehicles in the vicinity. TSP events can be triggered at individual intersections or across corridors or entire street systems. An RSSZ event is triggered when a vehicle senses a reduced speed zone or the vehicle receives a message from an RSU or from another vehicle indicating a school zone. The message describing an RSSZ event can describe the speed of vehicles in the vicinity, headings of vehicles, and subsequent behavior of each vehicle.

At 316, in some implementations, the RSU uses an ML model to generate an update to functionality of the RSU based on the feature vector. An example ML model 616 is illustrated and described in more detail with reference to FIG. 6. The functionality of the RSU can be implemented in computer hardware (e.g., using components of the computer system 700 of FIG. 7), computer software, or firmware. An update to the functionality can be implemented by reconfiguring hardware of the RSU, a software update, or a firmware update. The ML model is trained to update the functionality of the RSU for vehicular management in proximity to the RSU.

In some implementations, the RSU encapsulates the messages describing the multiple events into Internet Protocol (IP) packets. The Internet Protocol is the network layer communications protocol in the Internet protocol suite for relaying datagrams across network boundaries. For example, the RSU sends the IP packets to a local MEC server for performing machine learning on the messages describing the multiple events to train an ML model (within the local MEC server) for preventing vehicular collisions. The RSU can receive a trained machine learning model from the local MEC server for updating functionality of the RSU. In some implementations, the ML model is downloadable, either directly from the local MEC server or via the RSU, by a vehicle for operating and/or navigating autonomously.

In some implementations, the RSU sends the messages describing the multiple events to a cloud server for performing machine learning on the messages describing the multiple events to train a machine learning model for preventing vehicular collisions in proximity to the RSU. The cloud server is a pooled, centralized server resource that is hosted and delivered over a network—typically the Internet—and can be accessed on demand by multiple users. The cloud server performs the same functions of a traditional physical server (e.g., a local MEC server), delivering processing power, storage and applications. In some implementations, the trained machine learning model is downloadable by the RSU for updating the RSU functionality and performing traffic management.

A machine learning model for operating autonomous vehicles that is trained by the cloud server (e.g., based on the messages describing the multiple events) can be downloaded by at least one of a second set of vehicles for operating the at least one of the second set of vehicles. The second set of vehicles can include vehicles 504*b-c*. For example, the trained machine learning model enables a vehicle to collect data on its surroundings from cameras and other sensors, interpret the data, and decide what actions to take. The vehicle can use the trained machine learning model to interpret complex vision tasks, localize itself in the environment, enhance perception, and actuate kinematic maneuvers.

In some implementations, the cloud server implements an access and mobility management function (AMF) of a 5G core network for communicating with the RSU and/or the local MEC server. For example, the cloud server uses the AMF to send a trained machine learning model to the RSU and/or the local MEC server for updating the RSU functionality. An example AMF 210 is illustrated and described in more detail with reference to FIG. 2. In some implementations, the cloud server implements a unified data management (UDM) function to process network user data, e.g., the messages describing the multiple events in a more centralized manner. An example UDM 208 is illustrated and described in more detail with reference to FIG. 2.

In some implementations, the cloud server implements a managed service operator (MSO) network, e.g., for a native wireless service offering. Control messages from the RSU and/or the local MEC server that are associated with a latency (e.g., 50 milliseconds (ms), 75 ms, or 100 ms) greater than a threshold latency (e.g., 0.1 ms, 0.5 ms, 1 ms, or 5 ms) can be sent to the MSO in the cloud server for processing. Control messages from the RSU and/or the local MEC server that are associated with a latency less than a threshold latency can be processed within the local MEC server. The MSO function can partner with a managed network operator (MNO) implemented in the cloud server to offer ubiquitous wireless service to users, for example, a user of the mobile device 508 illustrated and described in more detail with reference to FIG. 5. For example, when the cloud server and/or the local MEC server determine a potential collision or determine that a collision has occurred, a server sends a message to each mobile device and/or the OBU of each vehicle near the RSU to decrease speed below a threshold speed, e.g., 20 miles per hour (mph), 10 mph, or 1 mph.

At 320, the RSU is operated using the updated functionality to communicate with a second set of OBUs (e.g., OBUs 524*b-c*) of a second set of vehicles (e.g., vehicles 504*b-c*) over the PC5 interface (e.g., 528*c*). In some implementations, the first set of vehicles and the second set of vehicles overlap. The communication with the second set of vehicles is to improve traffic management and prevent vehicular collisions among the second set of vehicles. In an example, the RSU indicates that vehicles should slow down when passing through an intersection. In an example, the RSU indicates that another vehicle is approaching when a vehicle is trying to turn left. Each of the second set of vehicles is operating at less than a threshold distance from the RSU. The RSU performs local traffic management functions within an area that lies within the threshold distance from the RSU. For example, the threshold distance can be 0.01 miles, 0.05 miles, or 0.1 miles. The C-V2X technology is thus used to expose vehicular traffic information and traffic control information for safety applications as well as improve autonomous driving capability. The events modeling behavior of the vehicles (e.g., at an intersection) are collected to determine how the intersection is operating and to improve traffic management.

Figure 4:
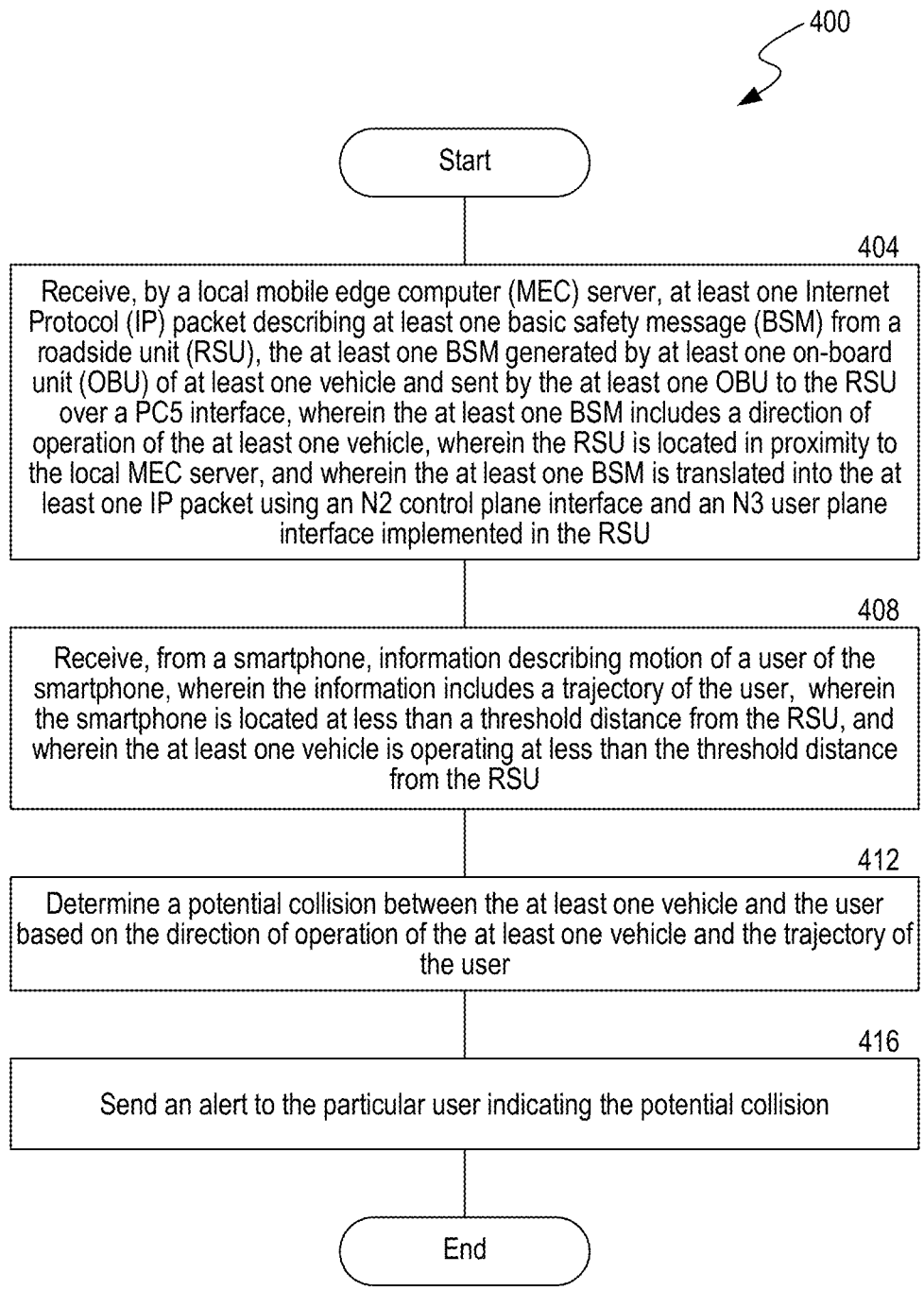
FIG. 4 is a flowchart that illustrates an example process for a C-V2X local mobile edge computing (MEC) server interface for mobile services.

FIG. 4 is a flowchart that illustrates an example process 400 for a C-V2X local mobile edge computing (MEC) server interface for mobile services. In some embodiments, the process 400 is performed by a local MEC server. A local MEC server is part of a network architecture that enables cloud computing capabilities and an IT service environment at the edge of a cellular network (or at the edge of any network). An example local MEC server 512 is illustrated and described in more detail with reference to FIG. 5. In some embodiments, the process 400 is performed by a computer system, e.g., the example computer system 700 illustrated and described in more detail with reference to FIG. 7. Particular entities, for example, the interface device 516 or a cloud server, perform some or all of the steps of the process in other embodiments. The interface device 516 is illustrated and described in more detail with reference to FIG. 5. Likewise, embodiments can include different and/or additional steps or can perform the steps in different orders.

At 404, a computer server (e.g., a local MEC server or a cloud server) receives information (e.g., at least one IP packet) describing at least one basic safety message (BSM) from a computer device (e.g., the interface device 516 or an RSU). The computer server can receive information describing a direction of operation, speed, acceleration, location, or angular velocity of a vehicle. Example vehicles 504*a-c* are illustrated and described in more detail with reference to FIG. 5. In some implementations, the information is received using an N2 control plane interface and an N3 user plane interface implemented in the computer device. In some implementations, the at least one IP packet is received by the computer server using a non-3GPP inter-working function (N3IWF) implemented in the RSU. The N3IWF acts as a gateway for the 5G core network (CN) with support for the N2 and N3 interfaces towards the 5GCN.

A BSM contains data about a vehicle's position, speed, or acceleration. An RSU or another vehicle can receive BSMs and determine information about traffic conditions. For example, BSMs can be combined to calculate traffic flows, speeds, and densities to obtain queue lengths and travel time estimates. The at least one BSM is generated by at least one OBU of at least one vehicle and sent by the at least one OBU to a computer device or an RSU over a PC5 interface. The PC5 interface 528*a* is between vehicle 504*a* (OBU 524*a*) and device 516 as illustrated in FIG. 5. Example OBUs 524*a-c* are illustrated and described in more detail with reference to FIG. 5. The at least one BSM includes a direction of operation (heading) of the at least one vehicle.

The RSU is located in proximity to the local MEC server. For example, the local MEC server is located at less than a threshold distance (e.g., 0.01 miles, 0.05 miles, 0.1 miles, 0.5 miles, or 1 mile) from the RSU to provide mobile (e.g., 5G) services and/or alerts to mobile devices in the vicinity of the RSU based on traffic conditions determined by the RSU. In some implementations, the at least one BSM is translated into the at least one IP packet using an N2 control plane interface and an N3 user plane interface implemented in the RSU. The N2 control plane interface operates between an access network and the SGC. The N2 control plane interface performs connection management. In some implementations, the computer device (e.g., RSU) implements a session management function (SMF) and a user plane function (UPF) for sending the first information to the computer server. The SMF is an element of the 5G Service-Based Architecture (SBA). The 5G SBA is described in more detail with reference to FIG. 2. The SMF interacts with the decoupled data plane, creating, updating, and removing Protocol Data Unit (PDU) sessions and managing session context with the UPF. An example SMF 214 is illustrated and described in more detail with reference to FIG. 2. The N3 user plane interface conveys user data to the UPF, enabling both low- and high-latency services. The UPF connects data coming over a radio area network (RAN) to the Internet. An example UPF 216 is illustrated and described in more detail with reference to FIG. 2.

At 408, the computer server receives, from a mobile device, information describing a trajectory and/or motion of a user of the mobile device. An example mobile device 516 is illustrated and described in more detail with reference to FIG. 5. In some implementations, the RSU, the local MEC server, and the mobile device are connected by a local area network (LAN). The LAN interconnects computer devices within a limited area (e.g., the vicinity of the RSU) using, for example, Ethernet, Wi-Fi, or a cellular network. In some implementations, the local MEC server is connected to an Ethernet port of the RSU over an optical fiber network. The Ethernet port is connected to devices on the inside of the RSU. The devices are connected to a Network Interface Controller (NIC). The local MEC server can be connected as Ethernet Over Fiber, a connection providing high-speed ethernet bandwidth of 1 Mbps to 10 Gbps delivered as Ethernet over fiber optic lines. In some implementations, the local MEC server is connected to a cloud server over a 5G Uu interface. The Uu interface is a 5G interface for cellular communication between a computer device and a base station or cloud server. The Uu interface supports uplink unicast communication as well as downlink unicast or multicast communication. In some implementations, a vehicle (e.g., 504a) is connected to the local MEC server or a cloud server over a 5G Uu interface 532b, as shown by FIG. 5.

The received information from the mobile device includes a position, a speed, a direction, or a trajectory of the user. The trajectory includes a current position, a connected set of past positions, and a connected set of predicted future locations. In an example, the user is standing at a crosswalk. In another example, a user is crossing a street at 3 mph in a northwesterly direction. The mobile device is located at less than a threshold distance from the RSU. The RSU provides traffic management functions in the vicinity of the RSU to vehicles and/or users located within the threshold distance from the RSU. For example, the threshold distance is 0.01 miles, 0.05 miles, 0.1 miles, or 0.5 miles. The at least one vehicle is operating at less than a threshold distance from the RSU. The threshold distance for the vehicle can be different from the threshold distance for the mobile device. For example, the threshold distance for the vehicle can be 0.02 miles, 0.1 miles, 0.2 miles, or 1 mile.

At 412, in some implementations, the computer server determines a potential collision between the at least one vehicle and the user based on the direction of operation (heading) of the at least one vehicle and the trajectory of the user. In some implementations, the computer server bases its determination on a trajectory of the vehicle, braking behavior or other operating behavior of the vehicle, speed of the vehicle, or an angular velocity of the vehicle. In some implementations, the computer server predicts the potential collision using a machine learning model based on the direction of operation and the trajectory. An example ML model 616 is illustrated and described in more detail with reference to FIG. 6. The features extracted from information received from the RSU can include a speed of the vehicle, points on the vehicle's trajectory, etc. In an example, the computer server performs environment perception and lane localization using data from the RSU and/or mobile devices in the vicinity. In an example, the computer server tracks reference lane markers ahead of the vehicle and determines a driving region for the vehicle. In an example, if an obstacle (e.g., the user and/or the mobile device) is detected in the driving region, the computer server determines a potential collision. In an example, the computer server estimates the movements of the vehicle and the mobile device, and determines a likelihood of a collision, given the trajectories of the vehicle and the mobile device.

At 416, in some implementations, the computer server sends an alert to the mobile device indicating the potential collision. The alert can be a text alert, an audible alert, a graphic displayed on a screen of the mobile device, or a signal indicating the mobile device should vibrate. In some implementations, the computer server and/or the RSU sends another alert to the OBU of the vehicle indicating the potential collision, e.g., indicating that the vehicle should stop or alter its course. The computer server can send, via the computer device (e.g., RSU), a message to the vehicle to reduce speed. In some implementations, the local MEC server implements an AMF of a 5G core network for sending the alert to the mobile device indicating the potential collision. An example AMF 210 is illustrated and described in more detail with reference to FIG. 2. In some implementations, the local MEC server implements a UDM function for managing the IP packets and the information describing motion of users. An example UDM 208 is illustrated and described in more detail with reference to FIG. 2.

In some implementations, an end-to-end latency (e.g., 0.1 ms or 0.5 ms) between receiving the first information describing the direction of operation of the vehicle and sending the alert to the mobile device indicating the potential collision is less than a threshold end-to-end latency (e.g., 1 ms or 5 ms). Compared to conventional, remote cloud-based cellular architectures, the deployment of the local MEC server can substantially prune the end-to-end communication latency.

FIG. 5 is a block diagram that illustrates an example C-V2X local MEC server interface environment 500 for mobile services. The environment 500 includes vehicles 504a-c, traffic light 520, an interface device 516 (e.g., RSU), local MEC server 512, and mobile device 508. The traffic light 520 is located at an intersection in the vicinity of the interface device 516. The interface device 516 and the local MEC server 512 are implemented using components of the example computer system 700 illustrated and described in more detail with reference to FIG. 7. In some implementations, the interface device 516 is attached to the traffic light 520. In some implementations, the interface device 516 or an RSU is implemented as a base station relying on the open RAN. Likewise, embodiments of the environment 500 can include different and/or additional components or can be connected in different ways.

A computer server (e.g., the local MEC server 512) receives messages from a first set of vehicles (e.g., vehicles 504a-b) describing multiple events triggered by the first set of vehicles. Example messages describing events are described in more detail with reference to FIG. 3. In some implementations, the multiple events include a left turn assist (LTA), an intersection movement assist (IMA), an emergency electronic brake light (EEBL), a forward collision warning (FCW), a blind spot warning (BSW), a lane change warning (LCW), a transit signal priority (TSP), or a reduced speed school zone (RSSZ), as described in more detail with reference to FIG. 3.

The messages describing the multiple events are anonymized with respect to an identity of each of the first set of vehicles. Each of the messages describing the multiple events is timestamped for further analysis, traffic planning, or generating improved autonomous driving models by the local MEC server 512. In some implementations, the messages describing the multiple events include a speed, a location, and a direction of operation of at least one of the first set of vehicles 504a-b.

Each of the vehicles 504a-c can be a conventional driver-operated vehicle, a vehicle having an advanced driver-assistance system (ADAS), a vehicle operated from a cloud server, or an autonomous vehicle. If a vehicle 504 is autonomous, it can be partially or fully autonomous. ADAS is any of a group of electronic technologies that assist drivers in driving and parking functions. ADAS use automated technology, such as sensors and cameras, to detect nearby obstacles or driver errors, and respond accordingly. ADAS can enable various levels of autonomous driving, depending on the features installed in the car.

In some implementations, the local MEC server 512 generates, using a machine learning model, an update to functionality of a computer device (e.g., interface device 516) based on the messages describing the multiple events. An example ML model 616 is illustrated and described in more detail with reference to FIG. 6.

The computer server sends, to the interface device 516, the update to the functionality using an N2 control plane interface and an N3 user plane interface. The N2 control plane interface and N3 user plane interface are described in more detail with reference to FIG. 4. The update to the functionality is for operating the interface device 516 to communicate with a second set of vehicles (e.g., vehicles 504b-c) for preventing vehicular collisions among the second set of vehicles in proximity to the interface device 516. For example, the interface device 516 can communicate with a mobile device of a driver of vehicle 504b, an ADAS device or system of vehicle 504c, or the OBU 524c of vehicle 504c.

Each of the first set of vehicles 504a-b and the second set of vehicles 504b-c is operating at less than a threshold distance from the interface device 516. Example threshold distances are provided with reference to FIGS. 3 and 4. The threshold distances are implemented for the interface device 512 to perform traffic management and alert functions in the vicinity of the interface device 512.

In some implementations, a computer server (e.g., the local MEC server 512) receives first information describing a direction of operation of a vehicle (e.g., vehicle 504a) from a computer device (e.g., the interface device 516). For example, the first information is received by the local MEC server 512 using a non-3GPP inter-working function (N3IWF) implemented in the interface device 516, as described in more detail with reference to FIG. 4. In some implementations, the local MEC server 512 is connected to an Ethernet port of the interface device 516 over an optical fiber network. The local MEC server 512 can further be connected to a cloud server over a 5G Uu interface.

In some implementations, the local MEC server 512 receives, from mobile device 508, second information describing a trajectory of a user of the mobile device 508. Each of the vehicle 504a and the mobile device 508 are located at less than a threshold distance from the interface device 516, e.g., in the vicinity of the traffic light 520. Example threshold distances are provided with reference to FIG. 4. The local MEC server 512 can implement a UDM function for managing the first and the second information. In some implementations, the interface device 512 or the local MEC server 512 sends control messages to a cloud server, wherein the control messages are associated with an end-to-end latency (e.g., 50 ms, 75 ms, or 100 ms) greater than a threshold end-to-end latency (e.g., 0.5 ms, 1 ms, or 5 ms). The AMF and UDM functionality can also be located on the cloud server. Further, the cloud server can implement MSO and MNO functions. For example, control messages associated with a latency greater than a threshold latency can be sent by the local MEC server 512 or the interface device 516 to the MSO in the cloud server for processing. Control messages associated with a latency lesser than a threshold latency are processed by the local MEC server 512.

In some implementations, the local MEC server 512 determines a potential collision between the vehicle 504a and the user using a machine learning model based on the direction of operation and the trajectory. The local MEC server 512 sends an alert to the mobile device 508 indicating the potential collision. The local MEC server 512 is connected to the mobile device 508 over the Uu interface 532a. For example, the local MEC server 512 implements an AMF of a 5G core network for sending the alert to the mobile device 508 indicating the potential collision. In some implementations, the local MEC server 512 or the interface device 516 send messages to all vehicles 504a-c in the vicinity. For example, when an actual collision is detected, messages are sent indicating that the speed limit in the vicinity has been set to 0 mph, such that all vehicles must stop.

Figure 6:
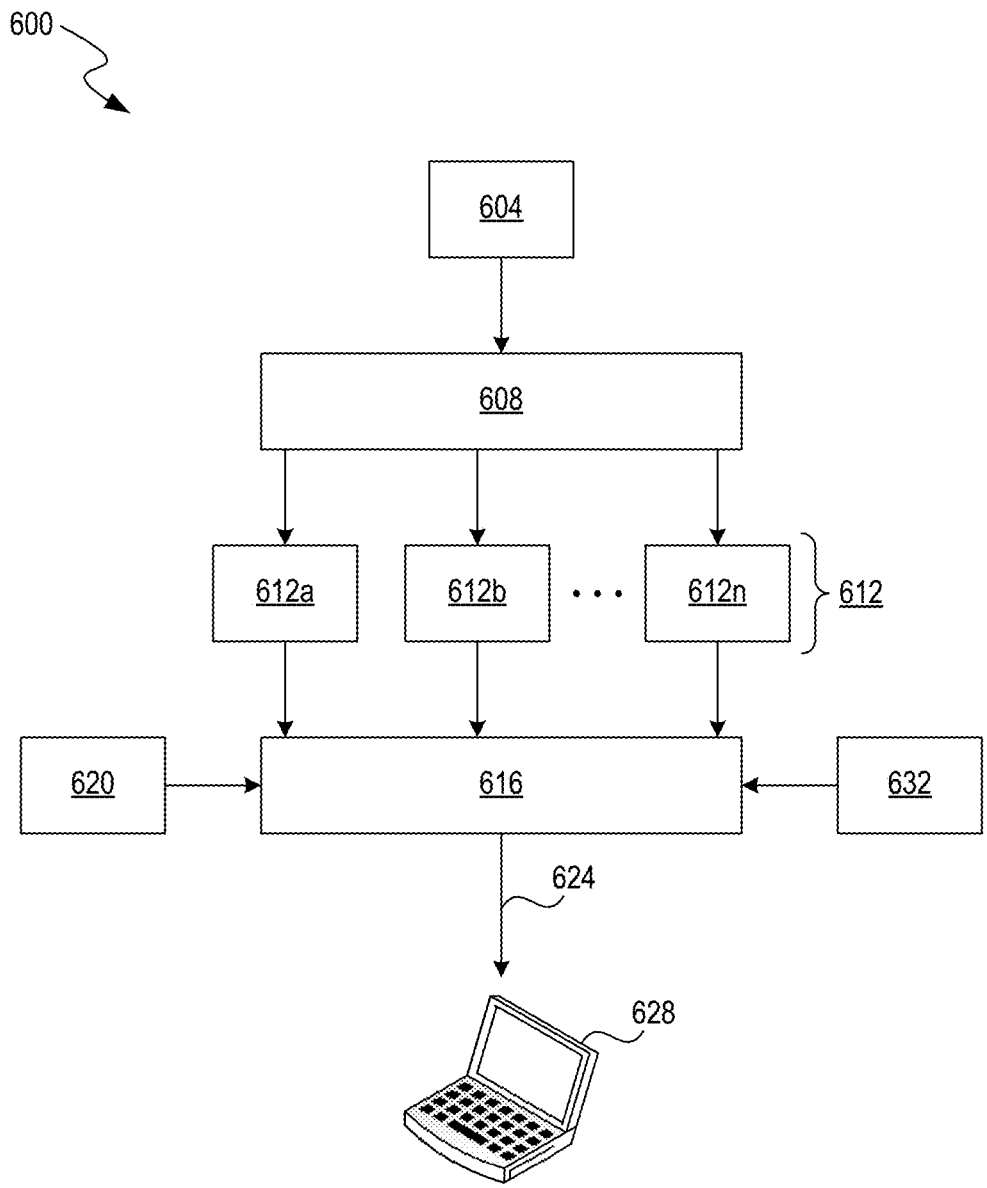
FIG. 6 is a block diagram that illustrates an example ML system that can implement aspects of the present technology.

FIG. 6 is a block diagram that illustrates an example ML system that can implement aspects of the present technology. The ML system 600 is implemented using components of the example computer system 700 illustrated and described in more detail with reference to FIG. 7. For example, the ML system 600 can be implemented on the processor 702 using instructions 708 programmed in the memory 706 illustrated and described in more detail with reference to FIG. 7. Likewise, implementations of the ML system 600 can include different and/or additional components or be connected in different ways. The ML system 600 is sometimes referred to as a ML module.

The ML system 600 includes a feature extraction module 608 implemented using components of the example computer system 700 illustrated and described in more detail with reference to FIG. 7. In some embodiments, the feature extraction module 608 extracts a feature vector 612 from input data 604. For example, the input data 604 is the messages describing the multiple events triggered by OBUs in response to multiple BSMs, as described in more detail with reference to FIG. 3. The feature vector 612 includes features 612a, 612b, . . . , 612n. For example, the feature extraction module 608 extracts a feature vector from the timestamped multiple events described in more detail with reference to FIG. 3.

The feature extraction module 608 reduces the redundancy in the input data 604, e.g., repetitive data values, to transform the input data 604 into the reduced set of features 612, e.g., features 612a, 612b, . . . , 612n. The feature vector 612 contains the relevant information from the input data 604, such that events or data value thresholds of interest can be identified by the ML model 616 by using this reduced representation. In some example embodiments, the following dimensionality reduction techniques are used by the feature extraction module 608: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In alternate embodiments, the ML model 616 performs deep learning (also known as deep structured learning or hierarchical learning) directly on the input data 604 to learn data representations, as opposed to using task-specific algorithms. In deep learning, no explicit feature extraction is performed; the features 612 are implicitly extracted by the ML system 600. For example, the ML model 616 can use a cascade of multiple layers of nonlinear processing units for implicit feature extraction and transformation. Each successive layer uses the output from the previous layer as input. The ML model 616 can thus learn in supervised (e.g., classification) and/or unsupervised (e.g., pattern analysis) modes. The ML model 616 can learn multiple levels of representations that correspond to different levels of abstraction, wherein the different levels form a hierarchy of concepts. In this manner, the ML model 616 can be configured to differentiate features of interest from background features.

In alternative example embodiments, the ML model 616, e.g., in the form of a CNN generates the output 624, without the need for feature extraction, directly from the input data 604. For example, the output 624 is an update to functionality of an RSU based on the feature vector, as described in more detail with reference to FIG. 3. In another example, the output 624 is a prediction of a potential collision based on a direction of operation of a vehicle and a trajectory of a mobile device, as described in more detail with reference to FIG. 4.

The output 624 is provided to the computer device 628, or the local MEC server 512 or the interface device 516 illustrated and described in more detail with reference to FIG. 5. The computer device 628 is a server, computer, tablet, smartphone, smart speaker, etc., implemented using components of the example computer system 700 illustrated and described in more detail with reference to FIG. 7. In some embodiments, the steps performed by the ML system 600 are stored in memory on the computer device 628 for execution. In other embodiments, the output 624 is displayed on the display device 718 illustrated and described in more detail with reference to FIG. 7.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 616 can be a CNN that includes both convolutional layers and max pooling layers. The architecture of the ML model 616 can be "fully convolutional," which means that variable sized sensor data vectors can be fed into it. For all convolutional layers, the ML model 616 can specify a kernel size, a stride of the convolution, and an amount of zero padding applied to the input of that layer. For the pooling layers, the model 616 can specify the kernel size and stride of the pooling.

In some embodiments, the ML system 600 trains the ML model 616, based on the training data 620, to correlate the feature vector 612 to expected outputs in the training data 620. For example, wherein the ML model 616 is trained to update the functionality of an RSU for vehicular management in proximity to the RSU, as described in more detail with reference to FIG. 3. As part of the training of the ML model 616, the ML system 600 forms a training set of features and training labels by identifying a positive training set of features that have been determined to have a desired property in question, and, in some embodiments, forms a negative training set of features that lack the property in question.

The ML system 600 applies ML techniques to train the ML model 616, that when applied to the feature vector 612, outputs indications of whether the feature vector 612 has an associated desired property or properties, such as a probability that the feature vector 612 has a particular Boolean property, or an estimated value of a scalar property. The ML system 600 can further apply dimensionality reduction (e.g., via linear discriminant analysis (LDA), PCA, or the like) to reduce the amount of data in the feature vector 612 to a smaller, more representative set of data.

The ML system 600 can use supervised ML to train the ML model 616, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 632 is formed of additional features, other than those in the training data 620, which have already been determined to have or to lack the property in question. The ML system 600 applies the trained ML model 616 to the features of the validation set 632 to quantify the accuracy of the ML model 616. Common metrics applied in accuracy measurement include: Precision and Recall, where Precision refers to a number of results the ML model 616 correctly predicted out of the total it predicted, and Recall is a number of results the ML model 616 correctly predicted out of the total number of features that had the desired property in question. In some embodiments, the ML system 600 iteratively re-trains the ML model 616 until the occurrence of a stopping condition, such as the accuracy measurement indication that the ML model 616 is sufficiently accurate, or a number of training rounds having taken place. The validation set 632 can include data corresponding to traffic management settings, mobile alerts, alerts for vehicles, instructions to vehicles to make maneuvers, etc. This allows the detected values to be validated using the validation set 632. The validation set 632 can be generated based on analysis to be performed.

Computer System

Figure 7:
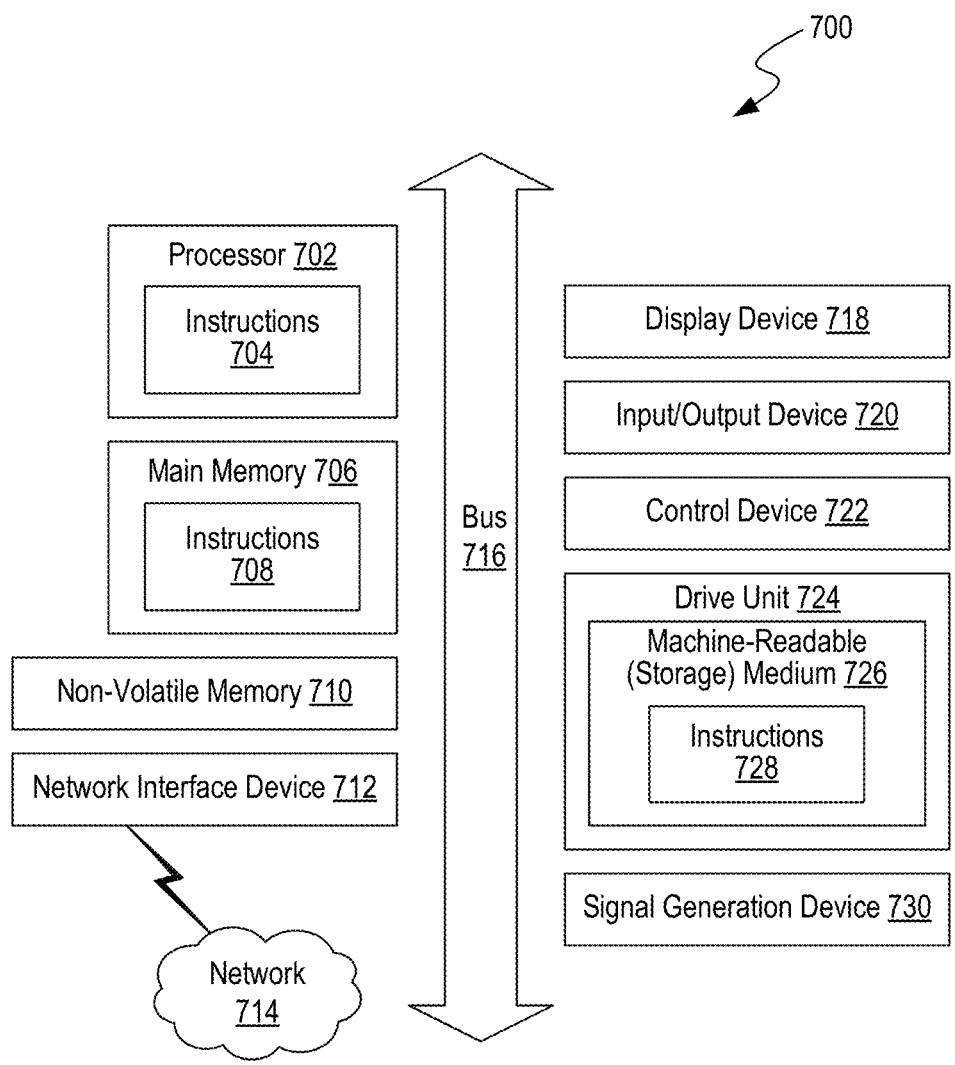
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A system comprising:
   at least one hardware processor; and
   at least one non-transitory memory storing instructions, which, when executed by the at least one hardware processor, cause the system to:
   receive, by a local mobile edge computer (MEC) server, at least one Internet Protocol (IP) packet describing at least one basic safety message (BSM) from a roadside unit (RSU), the at least one BSM generated by at least one on-board unit (OBU) of at least one vehicle and sent by the at least one OBU to the RSU over a direct communications (PC5) interface,
      wherein the at least one BSM includes a direction of operation of the at least one vehicle,
      wherein the RSU is located in proximity to the local MEC server, and
      wherein the at least one BSM is translated into the at least one IP packet using a control plane interface (N2) and a user plane interface (N3) implemented in the RSU;
   receive, from a mobile device, information describing motion of a user of the mobile device,
      wherein the information includes a trajectory of the user of the mobile device,
      wherein the mobile device is located at less than a threshold distance from the RSU, and
      wherein the at least one vehicle is operating at less than the threshold distance from the RSU;
   determine a potential collision between the at least one vehicle and the user of the mobile device based on the direction of operation of the at least one vehicle and the trajectory of the user of the mobile device; and
   send an alert to the mobile device indicating the potential collision,
      wherein the local MEC server implements an access and mobility management function (AMF) of a 5G core network for sending the alert to the mobile device indicating the potential collision, and
      wherein the local MEC server implements a unified data management (UDM) function for managing the at least one IP packet and the information describing motion of the user of the mobile device.

2. The system of claim 1, wherein the at least one IP packet is received by the local MEC server using a non-3GPP inter-working function (N3IWF) implemented in the RSU.

3. The system of claim 1, wherein the RSU, the local MEC server, and the mobile device are connected by a local area network (LAN).

4. The system of claim 1, wherein the alert is a first alert, and wherein the instructions cause the system to:
   send a second alert to the at least one OBU of the at least one vehicle indicating the potential collision.

5. The system of claim 1:
   wherein the local MEC server is connected to an Ethernet port of the RSU over an optical fiber network, and
   wherein the local MEC server is connected to a cloud server over a 5G Uu interface.

6. At least one non-transitory computer-readable storage medium storing instructions, which, when executed by at least one data processor of a system, cause the system to:
   receive, by a local mobile edge computer (MEC) server, at least one Internet Protocol (IP) packet describing at least one basic safety message (BSM) from a roadside unit (RSU), the at least one BSM generated by at least one on-board unit (OBU) of at least one vehicle and sent by the at least one OBU to the RSU over a direct communications (PC5) interface,
      wherein the at least one BSM includes a direction of operation of the at least one vehicle,
      wherein the RSU is located in proximity to the local MEC server, and
      wherein the at least one BSM is translated into the at least one IP packet using a control plane interface (N2) and a user plane interface (N3) implemented in the RSU;
   receive, from a mobile device, information describing motion of a user of the mobile device,
      wherein the information includes a trajectory of the user of the mobile device,
      wherein the mobile device is located at less than a threshold distance from the RSU, and
      wherein the at least one vehicle is operating at less than the threshold distance from the RSU;
   determine a potential collision between the at least one vehicle and the user of the mobile device based on the direction of operation of the at least one vehicle and the trajectory of the user of the mobile device; and
   send an alert to the mobile device indicating the potential collision,
      wherein the local MEC server implements an access and mobility management function (AMF) of a 5G core network for sending the alert to the mobile device indicating the potential collision, and wherein the local MEC server implements a unified data management (UDM) function for managing the at least one IP packet and the information describing motion of the user of the mobile device.

7. The at least one non-transitory computer-readable storage medium of claim 6, wherein the at least one IP packet is received by the local MEC server using a non-3GPP inter-working function (N3IWF) implemented in the RSU.

8. The at least one non-transitory computer-readable storage medium of claim 6, wherein the RSU, the local MEC server, and the mobile device are connected by a local area network (LAN).

9. The at least one non-transitory computer-readable storage medium of claim 6, wherein the alert is a first alert, and wherein the instructions cause the system to:

send a second alert to the at least one OBU of the at least one vehicle indicating the potential collision.

10. The at least one non-transitory computer-readable storage medium of claim 6:

wherein the local MEC server is connected to an Ethernet port of the RSU over an optical fiber network, and wherein the local MEC server is connected to a cloud server over a 5G Uu interface.

11. A method comprising:

receiving, by a local mobile edge computer (MEC) server, at least one Internet Protocol (IP) packet describing at least one basic safety message (BSM) from a roadside unit (RSU), the at least one BSM generated by at least one on-board unit (OBU) of at least one vehicle and sent by the at least one OBU to the RSU over a direct communications (PC5) interface, wherein the at least one BSM includes a direction of operation of the at least one vehicle, wherein the RSU is located in proximity to the local MEC server, and wherein the at least one BSM is translated into the at least one IP packet using a control plane interface N2 and a user plane interface N3 implemented in the RSU;

receiving, from a mobile device, information describing motion of a user of the mobile device, wherein the information includes a trajectory of the user of the mobile device, wherein the mobile device is located at less than a threshold distance from the RSU, and wherein the at least one vehicle is operating at less than the threshold distance from the RSU;

determining a potential collision between the at least one vehicle and the user of the mobile device based on the direction of operation of the at least one vehicle and the trajectory of the user of the mobile device; and sending an alert to the mobile device indicating the potential collision, wherein the local MEC server implements an access and mobility management function (AMF) of a 5G core network for sending the alert to the mobile device indicating the potential collision, and wherein the local MEC server implements a unified data management (UDM) function for managing the at least one IP packet and the information describing motion of the user of the mobile device.

12. The method of claim 11, wherein the at least one IP packet is received by the local MEC server using a non-3GPP inter-working function (N3IWF) implemented in the RSU.

13. The method of claim 11, wherein the RSU, the local MEC server, and the mobile device are connected by a local area network (LAN).

14. The method of claim 11, wherein the alert is a first alert, and wherein the method comprises:

sending a second alert to the at least one OBU of the at least one vehicle indicating the potential collision.

15. The method of claim 11:

wherein the local MEC server is connected to an Ethernet port of the RSU over an optical fiber network, and wherein the local MEC server is connected to a cloud server over a 5G Uu interface.

* * * * *